US010308554B2

(12) United States Patent
Babayan et al.

(10) Patent No.: US 10,308,554 B2
(45) Date of Patent: Jun. 4, 2019

(54) CONCRETE COMPOSITION

(71) Applicant: Holcim Technology Ltd., Jona (CH)

(72) Inventors: David Babayan, Aarau Rohr (CH);
Moussa Baalbaki, Möriken (CH); Bill Gong, Markham (CA)

(73) Assignee: Holcim Technology Ltd., Rapperswil-Jona (CH)

( * ) Notice: Subject to any disclaimer, the term of this patent is extended or adjusted under 35 U.S.C. 154(b) by 0 days.

(21) Appl. No.: 15/576,179

(22) PCT Filed: May 18, 2016

(86) PCT No.: PCT/IB2016/000665
§ 371 (c)(1),
(2) Date: Nov. 21, 2017

(87) PCT Pub. No.: WO2016/189373
PCT Pub. Date: Dec. 1, 2016

(65) Prior Publication Data
US 2018/0148375 A1 May 31, 2018

(30) Foreign Application Priority Data

May 26, 2015 (AT) ..................................... 329/2015

(51) Int. Cl.
| | | |
|---|---|---|
| *C04B 14/06* | (2006.01) | |
| *C04B 28/04* | (2006.01) | |
| *C04B 22/06* | (2006.01) | |
| *C04B 24/02* | (2006.01) | |
| *C04B 24/04* | (2006.01) | |
| *C04B 24/20* | (2006.01) | |
| *C04B 24/26* | (2006.01) | |
| *C04B 28/08* | (2006.01) | |
| C04B 111/00 | (2006.01) | |
| C04B 111/60 | (2006.01) | |
| C04B 103/30 | (2006.01) | |

(52) U.S. Cl.
CPC .............. *C04B 28/04* (2013.01); *C04B 14/06* (2013.01); *C04B 22/064* (2013.01); *C04B 24/023* (2013.01); *C04B 24/04* (2013.01); *C04B 24/20* (2013.01); *C04B 24/2611* (2013.01); *C04B 28/08* (2013.01); *C04B 2103/302* (2013.01); *C04B 2111/00068* (2013.01); *C04B 2111/60* (2013.01); *C04B 2201/50* (2013.01); *Y02P 40/146* (2015.11); *Y02W 30/92* (2015.05); *Y02W 30/94* (2015.05)

(58) Field of Classification Search
CPC ......... C04B 14/06; C04B 14/28; C04B 18/08; C04B 18/141; C04B 20/008; C04B 22/064; C04B 24/02; C04B 24/023; C04B 24/04; C04B 24/20; C04B 24/226; C04B 24/2611; C04B 24/2641; C04B 28/04; C04B 28/08; C04B 2103/0088; C04B 2103/32; C04B 2103/58; C04B 2103/302; C04B 2111/00068; C04B 2111/60; C04B 2201/50; C94B 2111/00068; C94B 2111/60; C94B 2201/50

See application file for complete search history.

(56) References Cited

U.S. PATENT DOCUMENTS

| | | | |
|---|---|---|---|
| 6,384,141 B2 * | 5/2002 | Hirata | ................. C04B 24/2647 106/729 |
| 6,602,343 B1 | 8/2003 | Costa et al. | |
| 9,382,157 B2 | 7/2016 | Guzzetta et al. | |
| 9,926,234 B2 * | 3/2018 | Toussaint | ................ C04B 7/527 |
| 9,950,954 B2 * | 4/2018 | Mikaelsson | ............. C04B 28/04 |
| 2008/0178769 A1 | 7/2008 | Goodwin et al. | |
| 2009/0301009 A1 | 12/2009 | Falk et al. | |
| 2011/0001530 A1 | 1/2011 | Nishi et al. | |
| 2011/0015306 A1 | 1/2011 | Turpin | |
| 2012/0021206 A1 | 1/2012 | Oslejs et al. | |
| 2012/0097072 A1 | 4/2012 | Turpin, Jr. et al. | |
| 2015/0152006 A1 | 6/2015 | Guzzetta et al. | |

FOREIGN PATENT DOCUMENTS

| | | |
|---|---|---|
| DE | 202010014322 U1 | 12/2010 |
| EP | 1159233 A1 | 12/2001 |
| EP | 1714949 A1 | 10/2006 |
| EP | 2090552 A2 | 8/2009 |
| FR | 3006311 A1 | 12/2014 |
| JP | H08208302 A | 8/1996 |
| JP | 2010-006626 A | 1/2010 |
| JP | 2012-211040 A | 11/2012 |
| WO | 92/07714 A1 | 5/1992 |

(Continued)

OTHER PUBLICATIONS

International Search Report for PCT/IB2016/000665 dated Aug. 23, 2016 submitted herewith, 7 pages.
Written Opinion of the International Searching Authority (English) for PCT/IB2016/000665, 6 pages, [2016].
Database WPI, Week 199642, Aug. 13, 1996 (Aug. 13, 1996) Thomson Scientific, London, GB; AN 1996-421759.
Verein deutscher Zementwerke e.V. (Hrsg.), Zement-Taschenbuch 2008, 51.Ausgabe. Dusseldork: Verlag Bau + Technik GmgH, 2008, Seiten 138 and 148.

*Primary Examiner* — Anthony J Green
(74) *Attorney, Agent, or Firm* — Fitch, Even, Tabin & Flannery LLP

(57) ABSTRACT

The concrete composition includes, in a mixture with water, a hydraulic binder, sand and aggregates, wherein the hydraulic binder includes a Portland cement of high reactivity, and the hydraulic binder is present in an amount of 280-340 kg per cubic meter of concrete, a shrinkage reducing admixture is present in an amount of 0-4 L per cubic meter of concrete, and water is present in an amount of 140-160 L per cubic meter of concrete.

18 Claims, No Drawings

(56) References Cited

FOREIGN PATENT DOCUMENTS

| WO | 2010/026155 A1 | 3/2010 |
| WO | 2011/053103 A2 | 5/2011 |
| WO | 2014/015289 A1 | 1/2014 |

\* cited by examiner

CONCRETE COMPOSITION

CROSS-REFERENCE TO RELATED APPLICATIONS

This application is the U.S. national phase application filed under 35 U.S.C. § 371 of International Application No. PCT/IB2016/000665, filed May 18, 2016, designating the United States, and claims priority from Austrian Patent Application No. A 329/2015, filed May 26, 2015, and the complete disclosures of which applications are hereby incorporated herein by reference in their entirety for all purposes.

The invention refers to a concrete composition comprising in a mixture with water, a hydraulic binder, sand, aggregates, with reduced drying time once hardened.

Further, the invention refers to a hydraulic binder composition for producing a concrete with reduced drying time, while being able to provide a good amount of bleeding water, excellent fresh concrete behaviour, and comprising ordinary Portland cement, optionally a supplementary cementitious material and an expanding agent.

Concrete is a very widely used construction material with high strength and good durability. In addition to aggregates and water, it also contains Portland cement as a hydraulic binder, which produces strength-forming phases by reacting and solidifying in contact with water. Concrete based on Portland cement clinker is thus one of the most important construction materials worldwide.

When Portland cement formulations are mixed with water, hydration reactions immediately begin to form minerals. These reactions generate heat and form a dense microstructure of cement hydrates that gives concrete its final strength and durability properties. The water added to a concrete composition is also a chemical reactant that first acts by dissolving the mineral constituents of Portland cement. As these minerals dissolve, the concentration of mainly calcium, hydroxide, silicate, aluminate, and sulphate ions increase in the water of the fresh concrete composition. When the concentration has reached a sufficiently high level, a point of super-saturation, the ions precipitate in the form of mineral hydrates, such as ettringite, or CSH gel. These hydrates contain large amounts of water trapped in their respective mineral structures.

A cubic meter of concrete typically contains between 140 and 200 L of water, and between 280 and 450 kg of hydraulic binder. In most concrete compositions, the total amount of water exceeds the stoichiometry of the hydration reactions of Portland cement, which means that even after its final setting time, large amounts of free water remain in the concrete structure. This water fills capillary pores within the concrete mass, and gradually evaporates over time.

When concrete is used for interior floors, in many cases the hardened concrete surface is afterwards covered by protective or decorative layers such as paint, sealants, carpet, or wood. This additional layer forms a barrier to water migration and in case of large amounts of free water still within the concrete structure, the protective or decorative layers suffer chemical and physical changes upon water migration. The final results are uneven changes of the colour of the coating, reduction of its adherence to the underlying concrete surface, or swelling of wooden floorings. In all these situations, the concrete coating fails, and needs to be replaced. The costs and delays associated are potentially a major issue for the construction industry. To prevent this, the relative humidity within a concrete mass is measured according to the procedures described in the ASTM standards F2170 and F2420, and concrete floors should be covered once their relative humidity decreases to below a threshold value of 80%. In practice, the drying of concrete floors is slow: it can typically require 6 to 8 weeks for the relative humidity to reach 80%. It is a purpose of this invention to reduce these drying times.

US 2011/0015306 and US 2012/097072 disclose concrete compositions with reduced drying times. The concretes described are characterised by a relatively low water cement ratio of between 0.2 and 0.4, the addition of fine cementitious materials of high reactivity, the use of a standard shrinkage reducing admixture, and the use of a vapour attenuation agent selected from alkali metal halide salts, alkali metal nitrate salts and alkali metal nitride salts. The water cement ratio is kept as low as possible to ensure that the amount of free water in the concrete slab is kept low. The fine cementitious materials of increased reactivity increase the formation of hydrates during the early stages of the hardening reactions; increasing in turn the ratio between water trapped in mineral hydrates and free water in the pore solutions. The preferred fine materials are fine calcium carbonates or fine silica fume. Accelerators such as sodium nitrite or calcium silicate are used for the same purpose, as they increase the formation of hydrates. A standard shrinkage reducing agent such as polypropylene glycol is said to favour the formation of a denser network of smaller capillary pores in the concrete structure, facilitation the migration of free water to the surface of concrete where it evaporates. In the case of lightweight concrete slabs, synthetic polymer particles are preferred to lightweight aggregates since these later products considerably slow the drying of concrete. A high range water reducer also ensures good workability. The combination of all these elements enables drying times to be as low as three to four weeks.

When concrete is used in applications such as slabs and floors, it needs to fulfil specific performance criteria, such as a slump value of 10 to 15 cm, a relative low plastic viscosity to facilitate its placing, and enough bleeding water, i.e. a film of water that forms at the surface of concrete after haven been placed. This film of water ensures easy finishing of the fresh concrete surface, and provides self-curing protection that prevents the formation of cracks.

The concrete compositions described in US2011/0015306 and US2012/097072 are characterised by a lower water cement ratio than conventional flooring concretes, and contain fine reactive materials. These two specificities both have a negative impact on fresh concrete rheology: fresh concrete tends to be sticky, risks having a reduced workability retention time, and bleeding water may be suppressed. It is a purpose of this invention to develop a concrete composition with reduced drying times that also has a lower viscosity, good workability retention, and with which sufficient bleeding water is always achieved.

To solve these and other objectives, the invention is characterized in that the hydraulic binder comprises a Portland cement of high reactivity and the hydraulic binder is present in an amount of 280-340 kg per cubic meter of concrete, that a shrinkage reducing admixture is present in an amount of 0-4 L per cubic meter of concrete and that water is present in an amount of 140-160 L per cubic meter of concrete.

It was found that the concrete of the invention has the following advantages: when fresh, the rheology is similar to conventional concrete for flooring applications (reduced viscosity, slump and slump retention over time). Further, the setting time and strength development are similar to conventional concrete. In addition, once hardened, the drying times are significantly reduced.

In particular, it was found that using a Portland cement having a high reactivity contributes to the above advantages of the invention. Preferably, a Portland cement is considered having a high reactivity, if, either when used alone or in combination with other hydraulic binders, it provides a compressive strength at 28 days of at least 52.5 MPa and/or a compressive strength at 1 day of at least 20 MPa according to European Standards EN 196-2.

In particular, the reactivity of the hydraulic binder is selected such as to obtain a 28-days compressive strength of the concrete of >52.5 MPa according to European Standards EN 196-2.

In particular, the reactivity of the hydraulic binder is selected such as to obtain a 1-day compressive strength of the concrete of >20 MPa according to European Standards EN 196-2.

A high reactivity of the Portland cement may preferably be achieved if the Portland cement has a Blaine fineness of 4500-6500 $cm^2/g$.

According to a preferred embodiment of the invention the hydraulic binder comprises ordinary Portland cement and a supplementary cementitious material, such as granulated blast furnace slag, fly ash, pozzolans or mixtures thereof. The supplementary cementitious material is preferably present in an amount of 1-20 wt.-% of the hydraulic binder. In order to achieve sufficient reactivity, the supplementary cementitious material may preferably have a Blaine fineness of 4500-6500 $cm^2/g$.

According to the invention the concrete composition may contain a shrinkage reducing admixture in an amount of 0-4 L per cubic meter of concrete. In this connection, it was surprisingly found that the use of a shrinkage reducing admixture at lower binder amounts per cubic meter of concrete significantly lowers the drying time of concrete, whereas at higher binder contents, it tends to slow the drying of concrete. When used in specific conditions, the shrinkage reducing admixture accelerates the drying of hardened concrete.

In light of the above, a preferred embodiment of the invention provides for the shrinkage reducing admixture being present in an amount of 3-4 L per cubic meter of concrete and the hydraulic binder being present in an amount of 280-310 kg per cubic meter of concrete. Thus, a relatively high amount of shrinkage reducing admixture is used to reduce the drying time of concrete at lower binder amounts per cubic meter of concrete. In contrast, in another preferred embodiment of the invention, no or a little amount of shrinkage reducing admixture is used at higher binder amounts per cubic meter of concrete. In particular, the shrinkage reducing admixture may be present in an amount of 0-1 L per cubic meter of concrete and the hydraulic binder may be present in an amount of 310-340 kg per cubic meter of concrete.

In the context of the invention, conventional liquid shrinkage reducing admixtures may be used. Chemical shrinkage reducing admixtures are commonly used to mitigate drying shrinkage of concrete. They are in most cases a liquid mixture of surfactants and glycols. Their mechanism of action relies on the reduction of the surface tension and capillary forces upon free water evaporation in the pores of less than 50 nm diameter. These chemical admixtures do not cause the concrete to expand, nor prevent it from shrinking: their main purpose is to reduce the extent of shrinkage.

Preferably, the shrinkage reducing admixture is an organic admixture, in particular based on polypropylene glycol, polyethylene glycol and/or a glycol ether derivative, preferably in a liquid mixture with surfactants.

In order to improve the workability of the concrete mass, the mixture may preferably comprise a water reducing agent, in particular a polycarboxylate ether based or a polynaphthalene sulfonate based plasticizing admixture, the water reducing agent preferably being present in an amount of between 0.4 and 1.5 wt.-% of the hydraulic binder.

Plasticizing admixtures are sometimes also referred to as dispersing agents or flow agents and are deployed in order to improve workability with regard to flowability. Such admixtures are long chained organic molecules, that group around the cement particles and thus either bring about electrostatic repulsion between the particles or steric stabilisation of the particles, thereby increasing flowability of the building material.

According to a preferred embodiment of the invention, the concrete composition further comprises an expanding agent, such as CaO, preferably in an amount of 0.5-3 wt.-% of the hydraulic binder. Calcium oxide is a known expanding agent that is able to compensate the natural drying shrinkage that concrete undergoes during its service life. This reduces the formation of cracks resulting from plastic shrinkage of the concrete mass, which in turn increases the water tightness of concrete structures. It was found that the addition of calcium oxide at a dosage of up to 3.0 wt.-% does not have a significant impact on concrete drying times.

The concrete composition of the invention, in particular by adjusting the amount of water and hydraulic binder, allows to achieve a flow of the freshly mixed concrete at 10 min of at least 100 mm+/−10 mm.

In a particularly preferred embodiment, the concrete, within less than 30-50 days, in particular less than 30-40 days, after placing has a relative humidity of 80% according to ASTM F2170.

The invention will now be described with reference to the following exemplary embodiments.

Concrete was mixed according to several designs as described in Table 1. The aggregates used in all concrete compositions were identical and followed a 0-16 Fuller size gradation. All concretes contain 150 L of water per cubic meter. The dosage of the admixture was adjusted to reach a concrete slump at 10 minutes of 100 mm+/−10 mm. Mortar of concrete is sieved and concrete slabs of 30 by 90 cm size and 15 cm thickness were casted and cured in room at 20° C. and 65% relative humidity. The mortar is placed in a bowl and let to sit 45 minutes. The bowl is then gently tilted and the water that appeared is collected and weighed. Bleeding is then expressed as a percentage of total water in the concrete composition. The relative humidity is measured as function of time following the procedure described in ASTM F2170, and Table 2 reports the time in days required to reach 80% relative humidity.

TABLE 1

| Mix # | Total binder (kg/m3) | Slag content (wt-%) | Water reducer (wt-%) | Shrinkage reducing agent (L/m³) | CaO (wt-%) |
| --- | --- | --- | --- | --- | --- |
| 1 | 280 | 15 | 0.5 | 0 | 0 |
| 2 | 280 | 15 | 0.7 | 0 | 3 |
| 3 | 340 | 15 | 0.5 | 4 | 0 |
| 4 | 340 | 15 | 0.6 | 4 | 3 |
| 5 | 280 | 15 | 0.5 | 4 | 0 |
| 6 | 280 | 15 | 0.7 | 4 | 3 |
| 7 | 340 | 15 | 0.5 | 0 | 0 |
| 8 | 340 | 15 | 0.7 | 0 | 3 |

The results displayed in Table 2 show that under the described laboratory conditions, the reference concrete (mix

1) requires 100 days to dry to an internal relative humidity of 80%. Adding 3% calcium oxide does not have a significant impact on drying times. Comparing lines 1 and 2 to lines 7 and 8 shows that increasing the binder content decreases significantly the drying times. Interestingly, line 6 shows that the same shorter drying times can be achieved with leaner concrete that contains 4 L/m3 of shrinkage reducing agent. On the contrary, comparing lines 3 and 4 to lines 7 and 8 shows that adding the shrinkage reducing agent to a concrete containing more binder per cubic meter increases the drying times, that means the contrary effect to that observed at 280 kg of binder per cubic meter.

In all systems, bleeding water is collected, and remains highest in the reference concrete (mix #1). Even the concrete compositions that give the lowest drying times have acceptable bleeding water amounts.

TABLE 2

| Mix # | Time to reach 80% relative humidity (days) | Bleeding at 45 minutes (wt-%) |
|---|---|---|
| 1 | 100 | 4.6 |
| 2 | 105 | 3.2 |
| 3 | 69 | 3.2 |
| 4 | 75 | 2.2 |
| 5 | 39 | 4.5 |
| 6 | 47 | 3.8 |
| 7 | 40 | 3.1 |
| 8 | 39 | 2.4 |

To sum up, the invention describes concrete compositions that combine several opposing physical properties: reduced drying times, but good fresh concrete workability and capacity to generate bleeding water at the concrete surface once placed. Further, the concrete compositions of this invention exhibit no stickiness. It was found that the use of shrinkage reducing admixtures, in specific conditions of water and binder amounts per cubic meter of concrete, act as an accelerator for concrete drying.

The invention claimed is:

1. A concrete composition comprising, in a mixture with water, a hydraulic binder, sand and aggregates, wherein the hydraulic binder comprises a Portland cement of high reactivity, wherein the Portland cement has a Blaine fineness of 4500-6500 cm$^2$/g, characterized in that the hydraulic binder is present in an amount of 280-310 kg per cubic meter of concrete, that a shrinkage reducing admixture is present in an amount of 3-4 L per cubic meter of concrete, wherein the shrinkage reducing admixture is an organic admixture, and that water is present in an amount of 140-160 l per cubic meter of concrete.

2. A concrete composition according to claim 1, wherein the reactivity of the hydraulic binder is selected so as to obtain a 28d compressive strength of the concrete of >52.5 MPa.

3. A concrete composition according to claim 1, wherein the reactivity of the hydraulic binder is selected so as to obtain a 1d compressive strength of the concrete of >20 MPa.

4. A concrete composition according to claim 1, wherein the hydraulic binder comprises a supplementary cementitious material.

5. A concrete composition according to claim 4, wherein the supplementary cementitious material is present in an amount of 1-20 wt.-% of the hydraulic binder.

6. A concrete composition according to claim 4, wherein the supplementary cementitious material has a Blaine fineness of 4500-6500 cm$^2$/g.

7. A concrete composition according to claim 1, further comprising an expanding agent in an amount of 0.5-3 wt. % of the hydraulic binder.

8. A concrete composition according to claim 1, further comprising a water reducing agent.

9. A concrete composition according to claim 8, wherein the water reducing agent comprises poly-carboxylate ether or polynaphthalene sulfonate.

10. A concrete composition according to claim 1, wherein the concrete composition is freshly mixed and the amount of water and hydraulic binder is selected so as to reach a flow of the freshly mixed concrete at 10 min of at least 100 mm+/−10 mm.

11. A concrete composition according to claim 1, wherein within less than 50 days after placing the concrete has a relative humidity of 80% according to ASTM F2170.

12. A concrete composition according to claim 1, wherein the shrinkage reducing admixture is based on polypropylene glycol, polyethylene glycol and/or a glycol ether derivative, and is, optionally, in a liquid mixture with surfactants.

13. A concrete composition according to claim 4, wherein the hydraulic binder comprises, as the supplementary cementitious material, ground granulated blast furnace slag, fly ash, pozzolans, ground limestone or mixtures thereof.

14. A concrete composition according to claim 7, wherein the expanding agent comprises CaO.

15. A concrete composition according to claim 8, wherein the water reducing agent, is present in an amount between 0.4 and 1 wt. % of the hydraulic binder.

16. A concrete composition according to claim 1, wherein within less than 40 days after placing the concrete has a relative humidity of 80% according to ASTM F2170.

17. A concrete composition according to claim 1, wherein within less than 30 days after placing the concrete has a relative humidity of 80% according to ASTM F2170.

18. A construction element comprising concrete obtained from a concrete mix composition according to claim 1.

* * * * *